United States Patent
Schwartzman et al.

(10) Patent No.: US 7,587,746 B1
(45) Date of Patent: Sep. 8, 2009

(54) METHODS AND APPARATUS FOR ENABLING AND DISABLING CABLE MODEM RECEIVER CIRCUITRY

(75) Inventors: Alejandro Schwartzman, San Jose, CA (US); Chrisanto Leano, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1128 days.

(21) Appl. No.: 09/846,849

(22) Filed: May 2, 2001

(51) Int. Cl.
*H04N 7/173* (2006.01)
*H04N 7/16* (2006.01)
*H04B 1/38* (2006.01)
*H04L 5/16* (2006.01)
*H04L 12/26* (2006.01)

(52) U.S. Cl. .............. 725/111; 725/117; 725/132; 725/140; 725/152; 375/222; 370/230

(58) Field of Classification Search ............... 725/111, 725/117, 132, 140, 152; 375/222, 257, 371; 370/230; 709/203
See application file for complete search history.

(56) References Cited

U.S. PATENT DOCUMENTS

| | | | | |
|---|---|---|---|---|
| 5,523,781 A | * | 6/1996 | Brusaw | 725/151 |
| 5,883,901 A | * | 3/1999 | Chiu et al. | 370/508 |
| 5,969,748 A | * | 10/1999 | Casement et al. | 725/27 |
| 6,233,235 B1 | * | 5/2001 | Burke et al. | 370/356 |
| 6,522,265 B1 | * | 2/2003 | Hillman et al. | 340/988 |
| 6,765,925 B1 | * | 7/2004 | Sawyer et al. | 370/465 |
| 6,785,564 B1 | * | 8/2004 | Quigley et al. | 455/574 |
| 2003/0037160 A1 | * | 2/2003 | Wall et al. | 709/233 |

OTHER PUBLICATIONS

Catherine Osborn, "Data Over Cable Service Interface Specifications, Operations Support System Interface Specification RF Interface, SP-OSSI-RFI-I02-98-410", Mar. 26, 1998, 30 pages.

* cited by examiner

*Primary Examiner*—Christopher Kelley
*Assistant Examiner*—Joseph G. Ustaris
(74) *Attorney, Agent, or Firm*—Weaver Austin Villeneuve & Sampson LLP

(57) ABSTRACT

Methods and apparatus for disabling and enabling the receiver circuitry of a cable modem connected to a cable network headend are described. The cable network headend transmits a message to the cable modem to disable the receiver circuitry when a cable network headend determines that the cable modem is idle. The cable modem listens for messages on the cable network during activation windows between periodic intervals. Messages arriving during these activation windows can enable the receiver circuitry of the cable modem as well as synchronize the clocks of the cable network headend and the cable modem. The cable modem can also self enable its receiver circuitry and inform the cable network headend of its enabled state.

21 Claims, 7 Drawing Sheets

METHODS AND APPARATUS FOR ENABLING AND DISABLING CABLE MODEM RECEIVER CIRCUITRY

BACKGROUND OF THE INVENTION

The present invention relates to enabling and disabling circuitry of a cable modem connected to a cable network headend. More specifically, it relates to a headend disabling the receiver circuitry of a cable modem when it is determined that the cable modem is inactive and enabling the receiver circuitry of a cable modem when the cable modem is determined to be active by either a headend or the cable modem.

Cable modems connected to headends in a cable modem network typically lack power management schemes for disabling the receiver circuitry of a cable modem. Cable modems typically have transmitter enable and disable states that allow the transmitter circuitry of cable modems to power down when not in use. However, the receiver circuitry of cable modems has no such capability. DOCSIS 1.0 defines no capabilities for the headend to power down components such as the tuner, the demodulator, the CPU, and the DSP when the cable modem is not in use. Consequently, the cable network headend continually transmits messages to the cable modem and the cable modem, even when not in use by a client, processes these messages and continuously sends replies to the headend. DOCSIS 1.0 is described in "Data-Over-Cable Service Interface Specifications: Operations Support System Interface Specification RF Interface SP-OSSI-RF-I02-980410", April 1998, the entirety of which is incorporated by reference for all purposes. The reply messages sent to the headend consume valuable upstream bandwidth.

Automatic timeouts for cable modems to power down are typically not used because of the difficulty of reactivating a cable modem. Manual power down schemes allow the user to disable the cable modem, but fail to allow the headend to enable the cable modem.

Currently available techniques for disabling and enabling receiver circuitry in a cable modem connected to a headend in a cable modem network have significant disadvantages with regard to saving power and preserving upstream bandwidth. It is therefore desirable to provide a system for disabling and enabling receiver circuitry of a cable modem connected to a headend in a cable modem network that exhibits desirable characteristics as well or better than the technologies discussed above.

SUMMARY OF THE INVENTION

According to the present invention, methods and apparatus are provided to enable or disable a cable modem based on cable modem activity or inactivity in a cable network.

The cable network headend determines whether a cabled modem with enabled receiver circuitry should have its receiver circuitry disabled based on inactivity. The inactivity can be detected by an activity detector located at a cable network headend. The activity detector can analyze traffic patterns between the cable modem and other network nodes. When the cable network headend determines that the receiver circuitry of a particular cable modem should be disabled, the cable network headend transmits a unicast SYNCH message to cable modem with instructions to disable receiver circuitry. The cable network headend can set the state of the cable modem to disabled. According to specific embodiments, the receiver circuitry can be disabled by the cable network headend. Alternatively, the transmitter circuitry and other cable modem components can be disabled as well.

The receiver circuitry may comprise tuner elements such as a RF amplifier, a mixer, a phase lock loop, a filter, and an IF amplifier as well as a demodulator, processors and memory. The receiver circuitry can be disabled or configured to run in a low power consumption mode for periodic intervals separated by activation windows when the receiver circuitry is enabled to receive SYNCH messages from the cable network headend. The information on periodic interval lengths and the activation window lengths can be contained in the vendor specific extensions of a SYNCH message. Alternatively, the periodic interval and activation window lengths can be pre-configured. The cable network headend stores information on when the activation windows for each particular cable modem will occur.

When the receiver circuitry of a cable modem is disabled, the cable modem can ignore all messages other than unicast SYNCH messages from the cable network headend. The unicast SYNCH messages can contain timing information and information on enabling cable modem receiver circuitry.

When a cable network headend receives data destined for a cable modem with disabled receiver circuitry, the cable network headend determines when the next activation window for the cable modem will occur. During the activation window, the cable modem with disabled receiver circuitry can receive and process a unicast SYNCH message with instructions to enable receiver circuitry. The cable network headend can set the state of the cable modem receiver circuitry to enabled and transmit the data to the cable modem.

A cable modem can also self enable its receiver circuitry and notify the cable network headend of its enabled state. Upon enabling the receiver circuitry, the cable modem transmits a message such as an INITIAL STATION MAINTENANCE or a REQUEST message to the cable network headend. The cable network headend receives the message from the cable modem with disabled receiver circuitry and sets the cable modem receiver circuitry state to enabled. The cable modem receiver circuitry state can also be identified as the cable modem state.

One aspect of the invention provides a method for disabling and enabling receiver circuitry of a cable modem connected to a headend in a cable modem network. The method may be characterized by the following sequence: (1) transmitting a first message with first instructions from the headend to the cable modem to disable the cable modem receiver circuitry for periodic intervals separated by activation windows; (2) setting the cable modem receiver circuitry state to disabled; (3) transmitting a second message with second instructions to enable the cable modem receiver circuitry from the headend so that the cable modem receives the message during an activation window, wherein any message received by a cable modem during a period outside the activation window is ignored; and (4) setting the cable modem receiver circuitry state to enabled.

The message for disabling cable modem receiver circuitry can be a unicast SYNCH message containing information on periodic interval and activation window lengths. The message for enabling the cable modem receiver circuitry during the activation window can also be a unicast SYNCH.

Another aspect of the invention pertains to a method for disabling and enabling cable modem receiver circuitry connected to a headend in a cable modem network. The method can be characterized by the following sequence: (1) receiving a first message with first instructions from the headend to disable the cable modem receiver circuitry for periodic intervals separated by activation windows; (2) disabling the cable modem receiver circuitry; (3) receiving a second message with second instructions to enable the cable modem receiver circuitry from the headend between periodic intervals during an activation window, wherein any message received outside the activation window is ignored; and (4) enabling cable modem receiver circuitry.

Another aspect of the invention is an apparatus with receiver circuitry connected to a cable network that can be disabled or enabled by a cable network headend. The apparatus may be characterized by the following features: (1) receiver circuitry configured to receive messages from the cable network when the receiver circuitry is enabled and during activation windows between periodic intervals when receiver circuitry is disabled; (2) transmitter circuitry for sending data onto the cable network; (3) memory; and (4) one or more processors coupled with the memory, the processors configured to disable the receiver circuitry when a first message received contains first instructions to disable and to enable the receiver circuitry when a second message received during an activation window contains second instructions to enable the receiver circuitry.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DETAILED DESCRIPTION OF SPECIFIC EMBODIMENTS

Reference will now be made in detail to a specific embodiment of the invention. An example of the specific embodiment is illustrated in the accompanying drawings. While the invention will be described in conjunction with a specific embodiment, it will be understood that it is not intended to limit the invention to one specific embodiment. To the contrary, it is intended to cover alternatives, modifications, and equivalents as may be included within the spirit and scope of the invention as defined by the appended claims.

Figure 1:
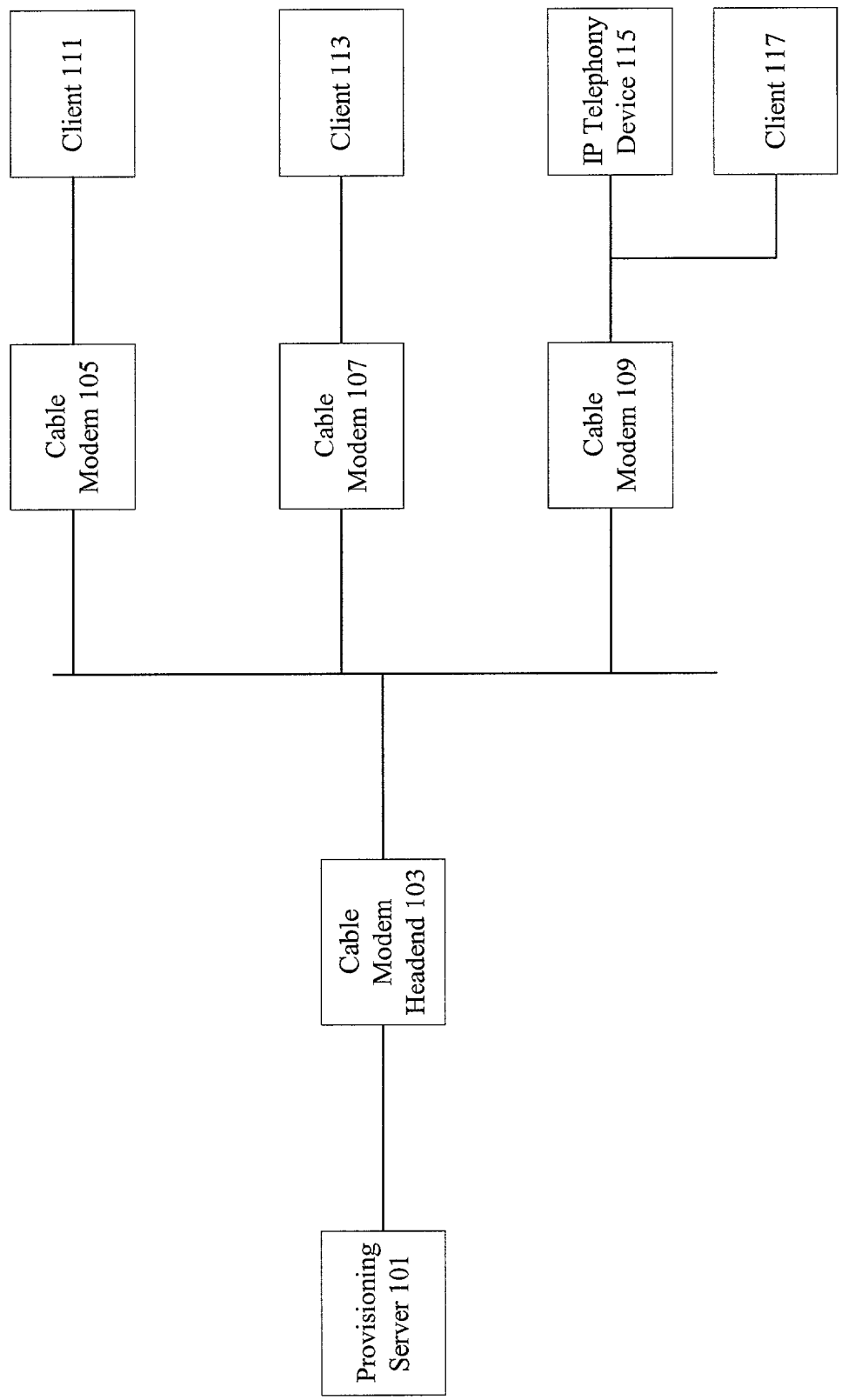
FIG. 1 is a diagram showing a cable modem network connected to cable modems with receiver circuitry that can be disabled by a cable network headend, according to specific embodiments.

This invention pertains to methods and systems for disabling and enabling a cable modem connected to a cable network headend, having a cable modem termination system (CMTS). FIG. 1 is a diagram showing a cable modem network connected to numerous cable modems. Each cable modem has receiver circuitry that can be disabled or enabled by a headend. A provisioning server 101 is connected to a cable network headend 103. The cable network headend is connected to cable modems 105, 107, and 109 via a cable network. Each cable modem has a cable port on the upstream side as part of its upstream circuitry and ethernet, USB, and telephony ports on the downstream side as part of its downstream circuitry. Cable modem 109 interacts with both IP telephony device 115 and a client 117. According to specific embodiments, cable network headend 103 supports the ability to disable and enable receiver circuitry of a cable modem 105. A headend can use the power-saving capabilities of cable modem 105, connected to client 111, even if a cable modem 107 does not have the same power-saving functionality.

The cable network headend 103 periodically broadcasts unidirectional SYNCH messages to cable modems 105, 107, and 109. The unidirectional, broadcasted, SYNCH messages provide timing information to each cable modem to allow each cable modem to synchronize its internal clock with the clock of the cable network headend. The headend also periodically sends unicast STATION MAINTENANCE messages to the individual cable modems, such as cable modems 105, 107, and 109. The headend uses the unicast STATION MAINTENANCE messages to determine which cable modems 105, 107, and 109 are live. The messages are typically sent every 30 seconds and require an acknowledgement (ACK) message from the cable modem to indicate that the cable modem is alive. If no ACK message is received from the cable modem after repeated transmissions of the STATION MAINTENANCE message (e.g. 16 attempts), the headend sets the cable modem state to offline. Generally, apparatus or logic used to track whether the state of the cable modem is enabled or disabled is referred to herein as an indication of cable modem receiver circuitry state. The indication of cable modem receiver circuitry state can be a bit, a flag, or some field in a table such as a state information table.

The headend maintains cable modem instances and accesses state information for each particular cable modem. A cable modem instance can contain the SID, the MAC address, timing information, voice capabilities, power-save capabilities, and the current state of the cable modem.

Figure 2:
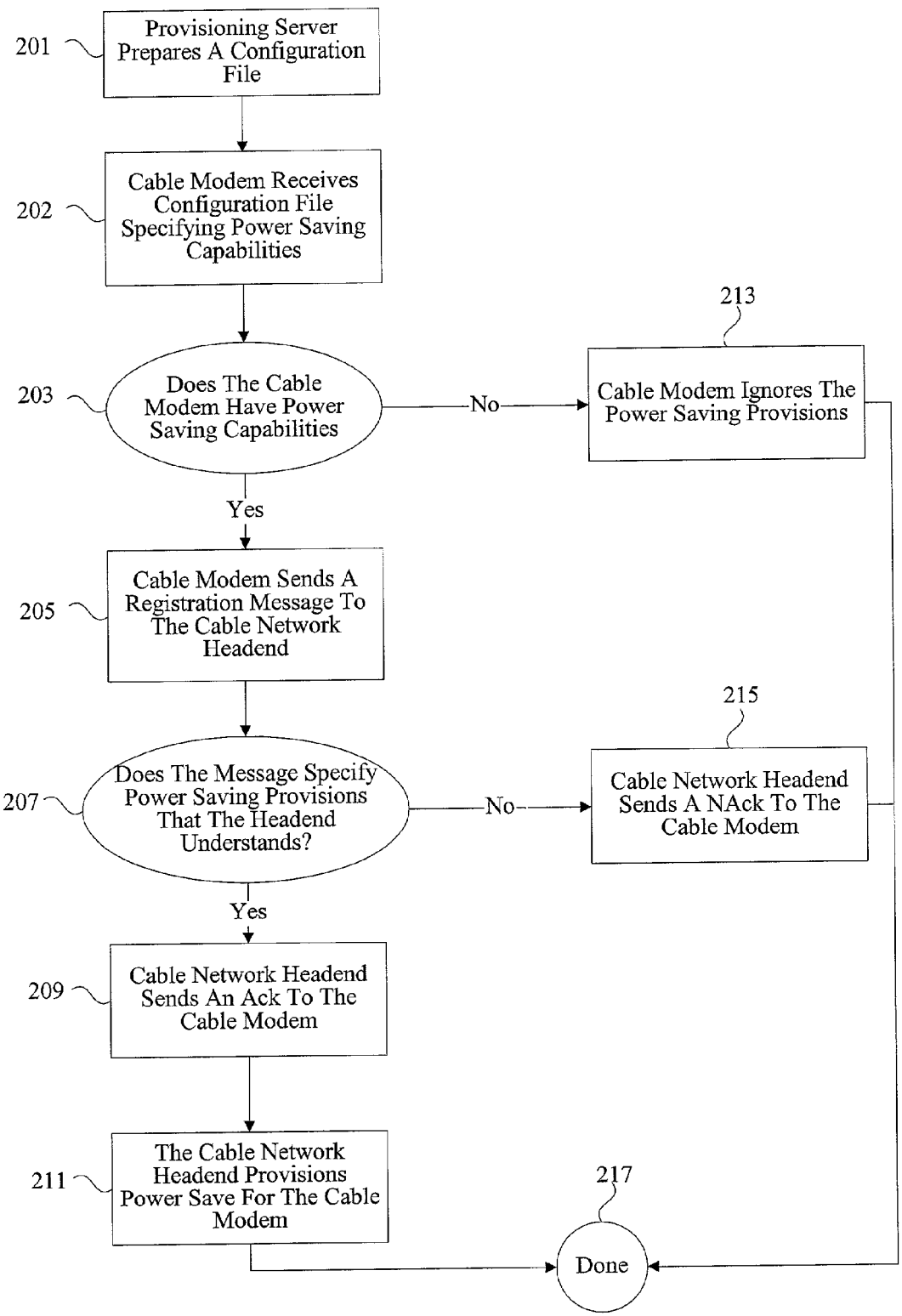
FIG. 2 is a process flow diagram illustrating the provisioning of a cable modem with or without power-saving capabilities connected to a headend, according to specific embodiments.

FIG. 2 is a flow diagram that illustrates provisioning of a cable modem connected to a headend where the receiver circuitry of the cable modem can be disabled and enabled. According to specific embodiments, a provisioning server 101 sends a configuration file through cable network headend 103 to a cable modem 109 at 201. The cable modem receives the configuration file specifying power-saving functionality at 202. More specifically, the configuration file specifics that the cable modem has the ability to disable and enable receiver circuitry. The power-saving functionality can be specified in vendor specific extensions in the configuration file. The cable modem then examines the vendor-specific instructions. If the cable modem does not understand the power-saving instructions, it ignores the power-saving provisions at 213. If the cable modem has power-saving capabilities and understands the vendor specific instructions at 203, the cable modem sends a registration message to the headend at 205.

The headend analyzes the registration message at 207. In this analysis, if the cable network headend does not have the capability of disabling or enabling receiver circuitry of a cable modem, the cable network headend sends a not acknowledged (NACK) message back to the cable modem at 215. The cable modem will not use its power-saving capabilities. If the headend understands the power-saving provisions, the headend sends an ACK to the cable modem at 209. The cable modem can now use its power-saving provisions. The headend provisions the receiver disable and enable capability for the cable modem at 211. At this stage, the power-saving provisioning or the failure to provision is complete.

Figure 3:
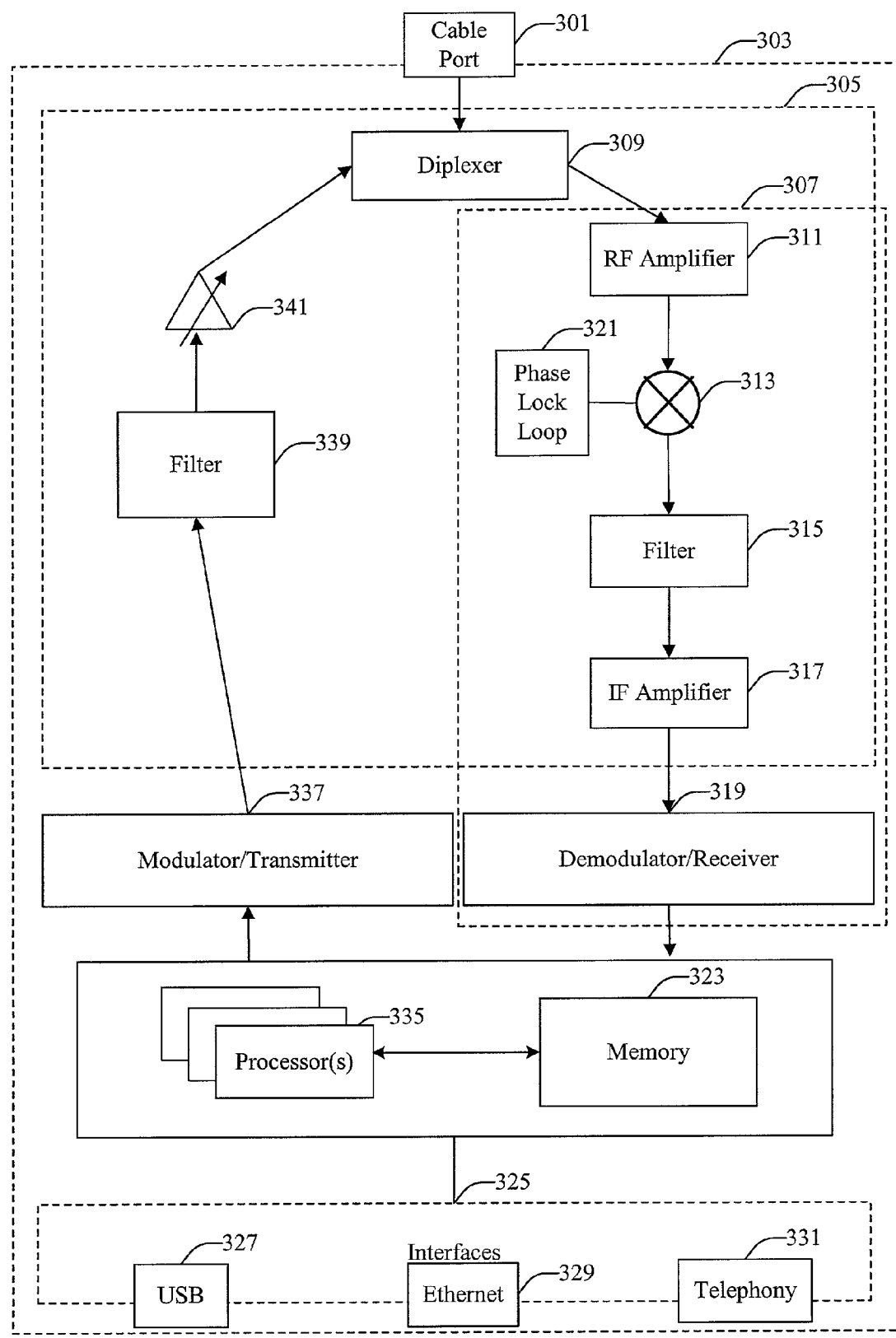
FIG. 3 is a diagram showing the components of a cable modem, according to specific embodiments.

FIG. 3 shows the components of a cable modem and the receiver circuitry that are disabled to provide power-save functionality and use less upstream bandwidth in accordance with specific embodiments of the present invention. According to specific embodiments, receiver circuitry may be disabled by the headend or by the cable modem itself. Alternatively, receiver and transmitter circuitry may be disabled simultaneously. According to specific embodiments, a cable modem 303 has a cable port 301 to connect the cable modem with a headend. It also has a tuner 305, modulator 337, demodulator 319, processors 335, memory 323, and USB 327, Ethernet 329, or telephony 331 ports to connect the cable modem to client hardware. It should be noted that multiple components of a cable modem may be contained in a single integrated circuit, or may be a combination of digital and analog circuitry.

Tuner 305 typically includes an upstream circuit for transmitting data to a headend and a downstream circuit for receiving data from the headend. The tuner can accommodate both functions through a diplexer connected to a single cable port. Downstream data sent to the cable modem from a headend is amplified using an RF amplifier 311. RF amplifier 311 is connected to a mixer 313 coupled with a phase lock loop 321. The phase lock loop 321 coupled with the mixer 313 selects a channel and converts the RF signal into an IF signal. The IF signal is passed through a filter 315 and amplified by an IF amplifier 317. The IF signal is introduced into a demodulator/receiver 319. The demodulator/receiver 319 contains components for analog to digital convertion, demodulation, frame synchronization, and error correction.

The downstream data transmission is then passed to processors 335 connected to memory 323. Processors 335 may include general purpose CPUs or special purpose DSPs. According to specific embodiments, the processors encapsulate and decapsulate packets within a MAC header, preferably according to the above-mentioned DOCSIS standard for transmission of data or other information. The encapulation and decapsulation can be performed by processors 335 coupled with memory 323 or by special purpose MAC hardware. The transmission is then passed onto the downstream interface 325 comprising ports supporting protocols and standards such as USB, PCI, Ethernet, and telephony.

A client wishing to send data upstream through the cable modem does so through interface 325. The packets are processed and encapsulated by processors 335 coupled with memory 323 and passed to the upstream modulator/transmitter 337. The processors 335 can also time the transmissions of the upstream bursts. The modulator/transmitter encodes the data, modulates the data onto a selected frequency, and converts the signal from digital to analog. The signal is filtered at 339 and passed on to a variable reverse amplifier 341 before transmitting the signal through diplexer 309 onto the cable network.

The transmitter circuitry of the cable modem typically has variable reverse amplifier 341, filter 339, and the modulator/transmitter 337. Cable modems typically have enable and disable functionality for transmitter circuitry. The transmit enable and disable states allow the cable modem to put the transmitter circuitry in standby mode, so that the cable modem consumes less power when no data needs to be transmitted to the headend.

Receiver circuitry 307 of the cable modem contains RF amplifier 311, phase lock loop 321, mixer 313, filter 315, and IF amplifier 317. Receiver circuitry 307 can additionally comprise processors, memory, and MAC hardware. According to specific embodiments, the disable state of the receiver circuitry allows the cable modem to cease supplying power to components of the receiver circuitry. When receiver circuitry 307 is disabled, the cable modem will ignore certain messages from the headend, such as STATION MAINTENANCE messages, and then will not send unnecessary messages upstream. Receiver circuitry 307 can also comprise processors 335 and memory 323. Memory can be disabled when the cable modem is disabled. Processors 335 including CPUs and DSPs as well as special-purpose MAC hardware can also be powered down or instructed to run at a lower clock speed when the cable modem is in its disabled state.

Figure 4:
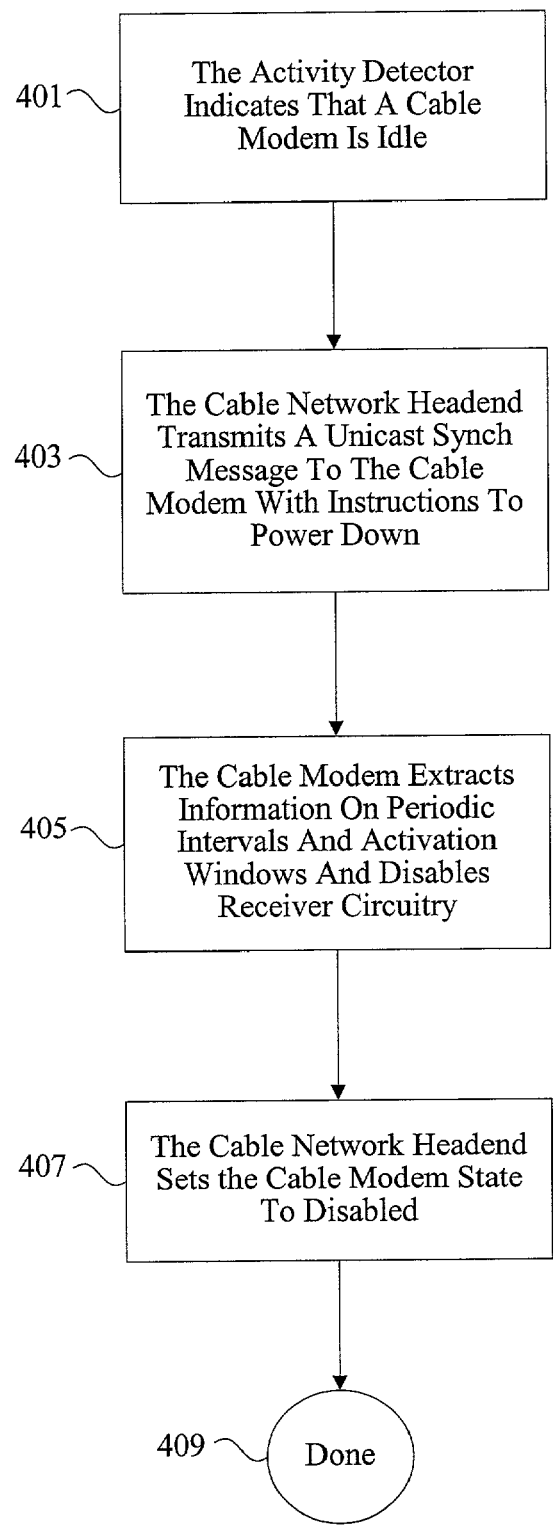
FIG. 4 is a process flow diagram illustrating the headend disabling the cable modem, according to specific embodiments.

FIG. 4 is a flow diagram illustrating the headend disabling the receiver circuitry of the cable modem, according to specific embodiments. At step 401, an activity detector indicates that a cable modem having receiver circuitry that can be disabled and enabled is idle at 401. The activity detector can be located at the headend and can monitor traffic patterns of cable modems in the network. If no data traffic is originating from a particular cable modem over a predetermined length of time, the activity detector can determine whether that particular cable modem should be disabled. According to specific embodiments, the activity detector may only consider certain types of traffic, such as data traffic destined for a node on an external network. The detector can then ignore system maintenance messages, such as STATION MAINTENANCE messages, between the cable modem and the headend. The activity detector may also only monitor the activity of cable modems listed as active in its state tables. The activity detector can elect not to monitor cable modems that have already been disabled.

If the activity detector recognizes that data is not being transmitted from an active cable modem, the headend can disable the cable modem by transmitting a unicast SYNCH message to the cable modem with instructions to power down at 403. Specifically, the cable modem's receiver circuitry is disabled, but other circuitry is still operational. In the described embodiment, the instructions are contained in the vendor-specific extensions of the SYNCH message.

The cable modem receives the instructions to extract the information contained in the unicast SYNCH message at 405. The headend sets the cable modem receiver circuitry state to disabled at 407. The instructions that the cable modem receives includes information on when the receiver circuitry of the cable modem should listen for enable messages. According to specific embodiments, the unicast SYNCH message contains information on when the cable modem should enable receiver circuitry and when the cable modem should disable receiver circuitry. The periods during which receiver circuitry should be disabled can be referred to as periodic intervals and the periods during which receiver circuitry should listen for enable messages can be referred to as activation windows. According to other specific embodiments, the periodic intervals and activation windows can be preconfigured, and the unicast SYNCH message would not need to carry information on periodic interval and activation window lengths.

The periodic intervals indicate how long the receiver circuitry should be disabled before listening for unicast SYNCH messages. The activation windows indicate how long the receiver circuitry should be enabled between these periodic intervals to allow the cable modem to receive unicast SYNCH messages. SYNCH messages synchronize the clock of the cable modem with the clock of the headend and instruct the headend to enable the receiver circuitry of the cable modem. The headend can enable the receiver circuitry of the cable modem when the headend has received and queued data destined for the cable modem with disabled receiver circuitry. For example, the periodic intervals can be 10 seconds while the activation window can be 100 milliseconds. The cable modem would enable its receiver circuitry for 100 millisecond activation windows between 10 second periodic intervals where the receiver circuitry is disabled. The headend can store this information so that it knows when to send unicast SYNCH messages to the cable modem.

According to specific embodiments, a cable modem with disabled receiver circuitry can listen for only unicast SYNCH messages during the activation window. All broadcast system maintenance messages and broadcast SYNCH messages are ignored. System maintenance messages can be left unacknowledged when received during an activation window, thereby reducing usage of upstream bandwidth.

The periodic interval and activation window lengths can vary based on the drift between the clock of the headend and the clock of the cable modem. The SYNCH messages typically synchronize the clocks of these two network elements. A longer periodic interval may require a longer activation window because of the drift in time between the two clocks. A longer periodic interval may require the headend to receive and queue more data destined for a cable modem with disabled receiver circuitry. The headend may have to wait longer for an activation window before it can send a unicast SYNCH message to the cable modem with instructions to enable its receiver circuitry.

It should be noted that the present invention does not require that the steps of this process be performed in any specified sequence. For example, in one embodiment of the invention, the headend can set the cable modem receiver circuitry state to disabled prior to transmitting a unicast SYNCH message to the cable modem with instructions to disable receiver circuitry.

Figure 5:
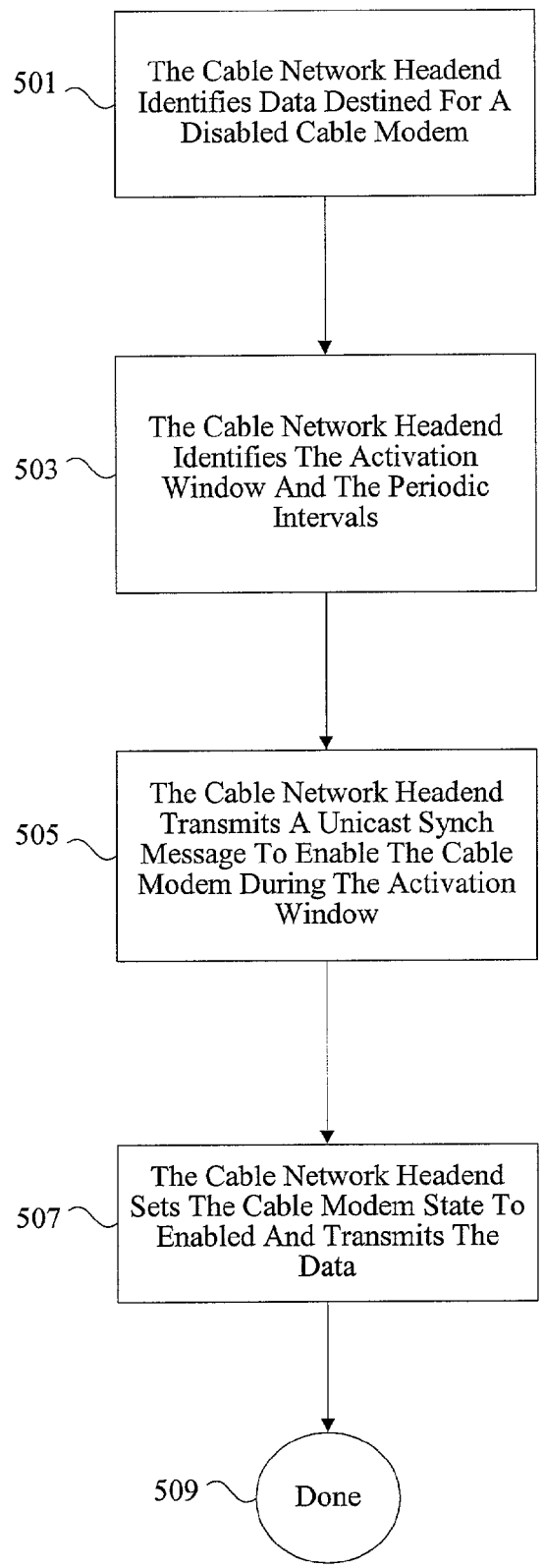
FIG. 5 is a process flow diagram showing the headend enabling the cable modem, according to specific embodiments.

FIG. 5 is a process flow diagram showing the headend enabling the cable modem, according to specific embodiments. A headend can enable a cable modem when data destined for the cable modem has been received at 501. The headend identifies the activation window and the periodic intervals and determines when it can send a SYNCH message containing instructions to enable receiver circuitry at 503. The headend transmits a unicast SYNCH message to enable the cable modem receiver circuitry during the activation window of the cable modem. The SYNCH message is transmitted so that the message will be received by the cable modem within the activation window.

The headend can set the cable modem receiver circuitry state to enabled and transmit the data to the cable modem at 507. The cable modem receiver circuitry state can be stored at the headend as part of the cable modem instance.

Figure 6:
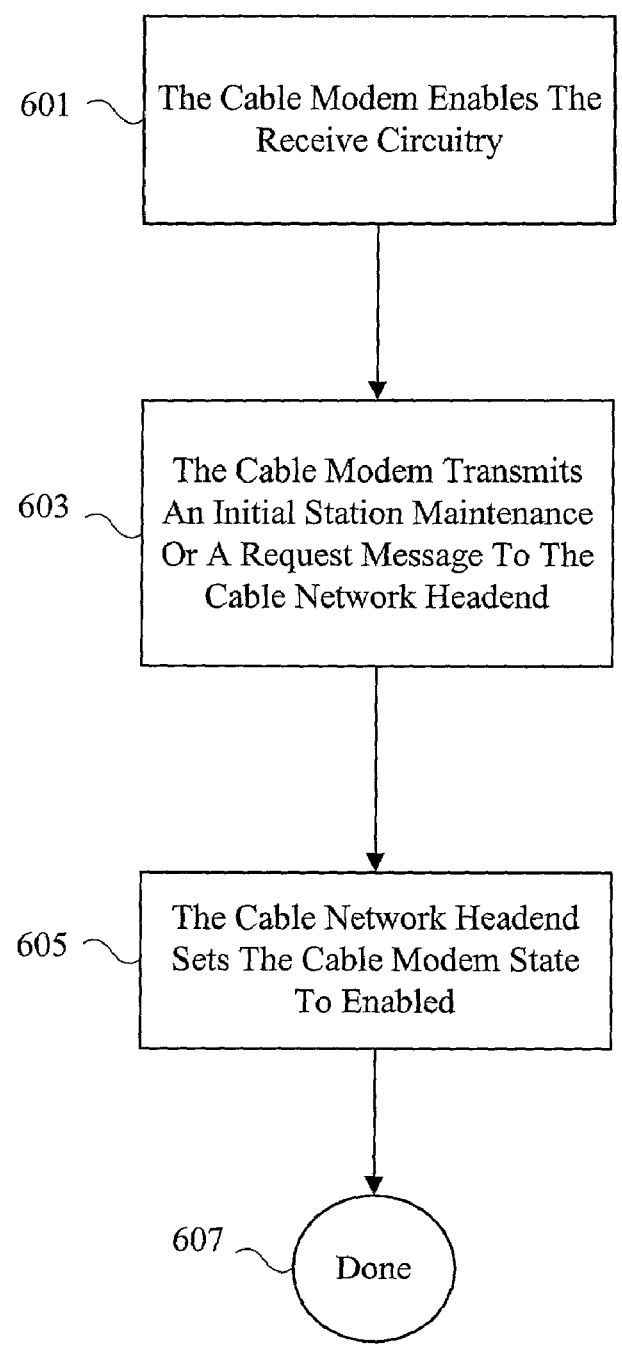
FIG. 6 is a process flow diagram showing a cable modem notifying the headend after it enables itself, according to specific embodiments.

FIG. 6 is a process flow diagram showing a cable modem notifying the headend after the cable modem enables its receiver circuitry, according to specific embodiments. At 601, the cable modem retrieves information from an external network and enables the receiver circuitry. The cable modem transmits an initial STATION MAINTENANCE or a REQUEST message to the headend at 603. The headend receives a message from the cable modem and sets the cable modem receiver circuitry state to enabled at 605.

Figure 7:
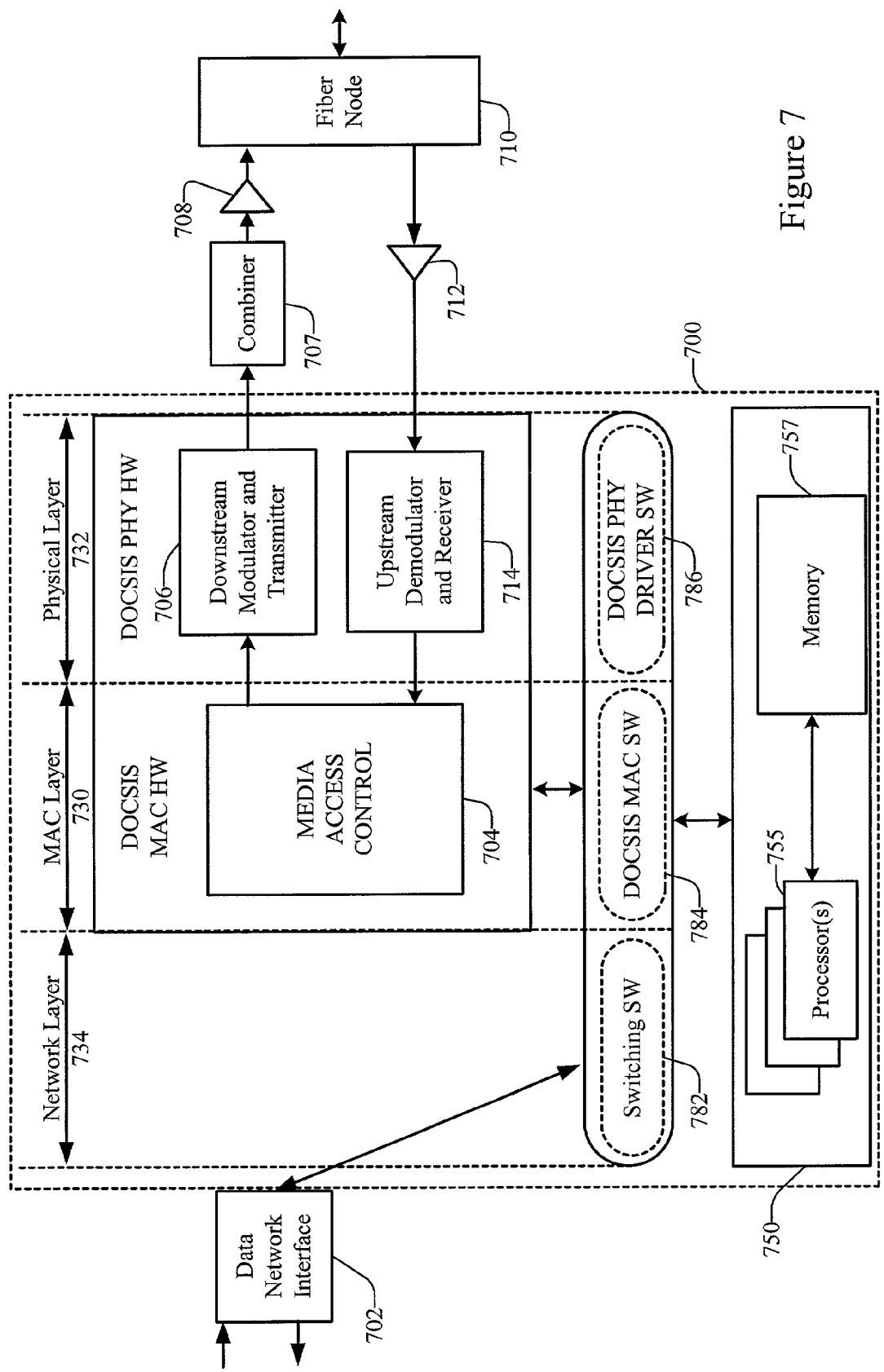
FIG. 7 is a block diagram showing the components of a cable network headend, according to specific embodiments.

FIG. 7 depicts the basic components of a CMTS, according to specific embodiments. A Data Network Interface 702 is an interface component between an external data source and the cable system. External data sources transmit data to data network interface 702 via optical fiber, microwave link, satellite link, or through various other media. Also as mentioned above, a Media Access Control Block (MAC Block) 704 receives data packets from a Data Network Interface 702 and encapsulates them with a MAC header.

In a specific embodiment as shown in FIG. 7, CMTS 205 provides functions on three network layers including a physical layer 732, a Media Access Control (MAC) layer 730, and a network layer 734. Generally, the physical layer is responsible for receiving and transmitting RF signals on the cable plant. Hardware portions of the physical layer include a downstream modulator and transmitter 706 and an upstream demodulator and receiver 714. The physical layer also includes software 786 for driving the hardware components of the physical layer.

Once an information packet is demodulated by the demodulator/receiver 714, it is then passed to MAC layer 730. A primary purpose of MAC layer 730 is to encapsulate and decapsulate packets within a MAC header, preferably according to the above-mentioned DOCSIS standard for transmission of data or other information.

MAC layer 730 includes a MAC hardware portion 704 and a MAC software portion 784, which function together to encapsulate information packets with the appropriate MAC address of the cable modem(s) on the system. After the upstream information has been processed by MAC layer 730, it is then passed to network layer 734. Network layer 734 includes switching software 782 for causing the upstream information packet to be switched to an appropriate data network interface on data network interface 702.

When a packet is received at the data network interface 702 from an external source, the switching software within network layer 734 passes the packet to MAC layer 730. MAC block 704 transmits information via a one-way communication medium to downstream modulator and transmitter 706. Downstream modulator and transmitter 706 takes the data (or other information) in a packet structure and converts it to modulated downstream frames, such as MPEG or ATM frames, on the downstream carrier using, for example, QAM 74 modulation (other methods of modulation can be used such as CDMA (Code Division Multiple Access) OFDM (Orthognal Frequency Division Multiplexing), FSK (FREQ Shift Keying)). The return data is likewise modulated using, for example, QAM 16 or QSPK. Data from other services (e.g. television) is added at a combiner 707. Converter 708 converts the modulated RF electrical signals to optical signals that can be received and transmitted by a Fiber Node 710 to the cable modem hub.

It is to be noted that alternate embodiments of the CMTS (not shown) may not include network layer 734. In such embodiments, a CMTS device may include only a physical layer and a MAC layer, which are responsible for modifying a packet according to the appropriate standard for transmission of information over a cable modem network. The network layer 734 of these alternate embodiments of CMTS devices may be included, for example, as part of a conventional router for a packet-switched network.

In a specific embodiment, the network layer of the CMTS is configured as a cable line card coupled to a standard router that includes the physical layer 732 and MAC layer 730. Using this type of configuration, the CMTS is able to send and/or receive IP packets to and from the data network interface 702 using switching software block 782. The data network interface 702 is an interface component between external data sources and the cable system. The external data sources transmit data to the data network interface 702 via, for example, optical fiber, microwave link, satellite link, or through various media. The data network interface includes hardware and software for interfacing to various networks such as, for example, Ethernet, ATM, frame relay, etc.

As shown in FIG. 7, the CMTS includes a hardware block 750 including one or more processors 755 and memory 757. These hardware components interact with software and other hardware portions of the various layers within the CMTS. Memory 757 may include, for example, I/O memory (e.g. buffers), program memory, shared memory, etc. Hardware block 750 may physically reside with the other CMTS components.

In one embodiment, the software entities 782, 784, and 786 are implemented as part of a network operating system running on hardware 750. Further, the provisions of this invention for providing quality of service for multicast streams are preferably implemented in software as part of the operating system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (TOM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the headend has a variety of embodiments which include a cable modem termination system coupled to a router or a multicast router. A cable modem can also be a separate entity or entirely integrated into a client system. In addition and as mentioned above, the invention may be implemented in both differential and single-ended configurations. Therefore, the scope of the invention should be determined with reference to the appended claims.

What is claimed is:

1. A method comprising:
   sending a configuration file to a cable modem, the configuration file including power-saving instructions included in vendor-specific extensions;
   receiving a registration message from the cable modem at a head end, the registration message including an indication that the cable modem has power-saving capabilities;
   sending an acknowledgement to the cable modem to allow the cable modem to use power-saving capabilities;
   transmitting a first unicast SYNCH message with first vendor-specific extensions from the headend to the cable modem to disable the cable modem receiver circuitry for periodic intervals separated by activation windows, wherein the cable modem ignores all broadcast messages after receiving the first unicast SYNCH message;
   maintaining at the headend an indication of cable modem receiver circuitry state;
   transmitting a second unicast SYNCH message with second vendor-specific extensions from the headend to enable the cable modem receiver circuitry such that the cable modem receives the second unicast SYNCH message during an activation window, wherein the headend is configured to identify the activation window corresponding to the time the cable modem receiver circuitry is enabled prior to transmitting the second unicast SYNCH message during the activation window; and
   setting the indication of cable modem receiver circuitry state to enabled.

2. The method of claim 1, wherein the unicast SYNCH message contains periodic interval and activation window information.

3. The method of claim 1, wherein the activation window is 100 milliseconds.

4. The method of claim 1, wherein each periodic interval is 10 seconds.

5. The method of claim 1, wherein messages the cable modem receives during the periodic interval are ignored.

6. The method of claim 1, wherein multicast messages the cable modem receives during the activation window are ignored.

7. The method of claim 1, wherein transmitter circuitry is disabled when receiver circuitry is disabled.

8. The method of claim 1, wherein no messages are transmitted from the cable modem to the headend during the periodic intervals.

9. A computer readable storage medium having computer code embodied therein, the computer readable storage medium comprising:
   computer code embodied for sending a configuration file to the cable modem, the configuration file including power-saving instructions included in vendor-specific extensions;
   computer code embodied for receiving a registration message from the cable modem, the registration message including an indication that the cable modem has power-saving capabilities;
   computer code for sending an acknowledgement to the cable modem to allow the cable modem to use power-saving capabilities;
   computer code for transmitting a first unicast SYNCH message with first vendor-specific extensions from the headend to the cable modem to disable the cable modem receiver circuitry for periodic intervals separated by activation windows, wherein the cable modem ignores all broadcast messages after receiving the first unicast SYNCH message;
   computer code for setting an indication of cable modem receiver circuitry state to disabled;
   computer code for transmitting a second unicast SYNCH message with second vendor-specific extensions from the headend to enable the cable modem receiver circuitry such that the cable modem receives the second unicast SYNCH message during an activation window, wherein the headend is configured to identify the activation window corresponding to the time the cable modem receiver circuitry is enabled prior to transmitting the second unicast SYNCH message during the activation window; and computer code for setting the indication of cable modem receiver circuitry state to enabled.

10. The computer readable storage medium of claim 9, wherein the activation window is 100 milliseconds.

11. The computer readable storage medium of claim 9, wherein each periodic interval is 10 seconds.

12. A headend connected to cable modems in a cable modem network, the cable modems comprising receiver circuitry that can be disabled and enabled, the headend comprising:

transmitter circuitry configured to send a configuration file to the cable modem, the configuration file including power-saving instructions included in vendor-specific extensions, receive a registration message from the cable modem, the registration message including an indication that the cable modem has power-saving capabilities, send an acknowledgement to the cable modem to allow the cable modem to use power-saving capabilities, transmit a first unicast SYNCH message with first vendor-specific extensions instructions from the headend to the cable modem to disable the cable modem receiver circuitry for periodic intervals separated by activation windows, wherein the cable modem ignores all broadcast messages after receiving the first unicast SYNCH message, wherein the transmitter circuitry is further configured to transmit a second unicast SYNCH message with vendor-specific extensions to the cable modem, the vendor-specific extensions directing the cable modem to enable the cable modem receiver circuitry, wherein the second unicast SYNCH message is received during the activation window;

memory; and a processor coupled with the memory and the transmitter circuitry, the processor configured to set an indication of cable modem state to disabled to correspond with the receipt of the first unicast SYNCH message by the cable modem and to set the indication of cable modem state to enabled to correspond with receipt of the second unicast SYNCH message by the cable modem during the activation window, wherein the processor is configured to identify the activation window corresponding to the time the cable modem receiver circuitry is enabled prior to transmitting the second message during the activation window.

13. The apparatus of claim 12, wherein the first message with first instructions from the headend to disable the cable modem receiver circuitry is a unicast SYNCH message.

14. The apparatus of claim 13, wherein the unicast SYNCH message contains periodic interval and activation window information.

15. The apparatus of claim 12, wherein the second message with second instructions to enable the cable modem receiver circuitry is a unicast SYNCH message.

16. The apparatus of claim 12, wherein the activation window is 100 milliseconds.

17. The apparatus of claim 12, wherein each periodic interval is 10 seconds.

18. The apparatus of claim 12, wherein messages the cable modem receives during the periodic interval are ignored.

19. The apparatus of claim 12, wherein multicast messages the cable modem receives during the activation window are ignored.

20. The apparatus of claim 12, wherein transmitter circuitry is disabled when receiver circuitry is disabled.

21. The apparatus of claim 12, wherein no messages are transmitted from the cable modem to the headend during the periodic intervals.

* * * * *